UNITED STATES PATENT OFFICE.

HERMANN WAGNER AND JAKOB KOHLHAAS, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

COLOR-LAKES.

1,071,832.     Specification of Letters Patent.     Patented Sept. 2, 1913.

No Drawing.     Application filed December 4, 1912. Serial No. 734,967.

*To all whom it may concern:*

Be it known that we, HERMANN WAGNER, Ph. D., chemist, and JAKOB KOHLHAAS, Ph. D., chemist, citizens of the Empire of Germany, residing at Höchst-on-the-Main, Germany, have invented certain new and useful Improvements in New Color-Lakes, of which the following is a specification.

We have found that the disazo dyestuff of the formula:

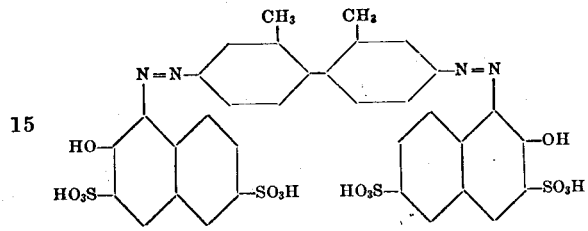

obtained by coupling the tetrazo derivative from m-tolidin with two molecular proportions of 2-naphthol-3-6-disulfonic acid, can be transformed by the methods used in the preparation of color-lakes into new valuable color-lakes which are remarkable for their beautiful, pure, bluish-red tint.

The new lakes described in our present application possess properties which fit them to fill a large gap in the series of color-lakes used in industry. They are particularly valuable owing to the fact that they are completely precipitated in the process of manufacture, notwithstanding that they contain more sulfonic groups than, for instance, are contained in Ponceau 5R. Furthermore they have the important advantage, that, even when produced upon heavy-spar as a substratum, they show a beautiful rich bluish-red tint. They are eminently suitable for coloring wall-paper especially deep tints, remarkable for their full and pure shade; this property becomes particularly apparent when the lakes are used in admixture with basic dyestuffs.

The color-lakes are prepared by the usual methods; the procedure may be, for instance, as follows, the parts being by weight:

Example I: Into 20 parts of heavy-spar, made into a paste with 50 liters of water are introduced a solution of 10 parts of aluminium sulfate in 100 liters of water, a solution of 5 parts of sodium carbonate in 50 liters of water, and a solution of 4 parts of the dyestuff in 140 liters of water. The dyestuff is then precipitated by adding to the heated mixture, while well stirring, a solution of 14 parts of barium chlorid in 140 liters of water, and the color-lake thus formed is worked up in the usual manner. When dry, the new lake forms a bluish-red powder, insoluble in water, oil, alcohol and benzene.

Example II: 10 parts of baryta are made into a paste with water; there is then added a solution of 10 parts of sulfate of alumina (18%) in 100 parts of water, a solution of 5 parts of calcined sodium carbonate in 50 parts of water, and a solution of 11 parts of barium chlorid in 100 parts of water. The whole is then precipitated at 50° C., washed three times, and there is then further added a solution of one part of calcined sodium carbonate in 10 parts of water, a solution of 1.5 parts of Turkey red-oil 50% in 15 parts of water, and a solution of 2.5 parts of the dyestuff in 100 parts of water, and finally the mixture is precipitated with a solution of 3 parts of magnesium chlorid in 30 parts of water.

Having now particularly described our invention, what we claim is:

1. As new products, color-lakes which are salts, insoluble in water, of the tetrazo compound of m-tolidin with two molecules of 2-naphthol-3.6-disulfonic acid corresponding to the formula:

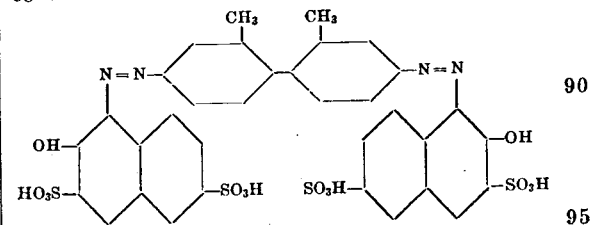

being violet to bluish-red powders, insoluble in oil, alcohol and benzene.

2. As a new product, the color-lake which is the barium salt, insoluble in water, of the tetrazo compound of meta-tolidin with two molecules of 2-naphthol-3.6-disulfonic acid corresponding to the formula:
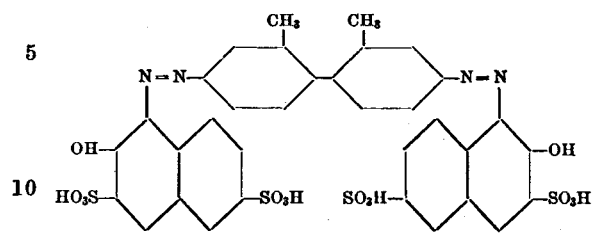
being a bluish-red powder, insoluble in oil, alcohol and benzene.
In testimony whereof, we affix our signatures in presence of two witnesses.
HERMANN WAGNER.
JAKOB KOHLHAAS.
Witnesses:
  JEAN GRUND,
  CARL GRUND.